(12) United States Patent
Niiya

(10) Patent No.: US 8,023,625 B2
(45) Date of Patent: Sep. 20, 2011

(54) COMMUNICATION SYSTEM AND VOICE MAIL APPARATUS

(75) Inventor: Norimasa Niiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1001 days.

(21) Appl. No.: 11/976,262

(22) Filed: Oct. 23, 2007

(65) Prior Publication Data

US 2008/0101562 A1 May 1, 2008

(30) Foreign Application Priority Data

Oct. 31, 2006 (JP) .................. 2006-297162

(51) Int. Cl.
*H04M 1/64* (2006.01)
*H04M 11/00* (2006.01)

(52) U.S. Cl. .............. 379/88.17; 379/93.24; 393/616; 707/10

(58) Field of Classification Search .......... 379/88.17; 709/206
See application file for complete search history.

(56) References Cited

U.S. PATENT DOCUMENTS

| | | | | |
|---|---|---|---|---|
| 5,557,659 A * | 9/1996 | Hyde-Thomson | ........ | 379/88.13 |
| 5,613,108 A * | 3/1997 | Morikawa | ............. | 1/1 |
| 6,295,552 B1 * | 9/2001 | Shibata | ........ | 709/206 |
| 6,351,523 B1 * | 2/2002 | Detlef | ........ | 379/88.14 |
| 2006/0177024 A1 * | 8/2006 | Frifeldt et al. | ........ | 379/88.22 |

FOREIGN PATENT DOCUMENTS

| | | |
|---|---|---|
| JP | 06-250949 | 9/1994 |
| JP | 2000-278439 | 10/2000 |
| JP | 2000-305849 | 11/2000 |
| JP | 2005-117152 | 4/2005 |
| JP | 2005-175895 | 6/2005 |

OTHER PUBLICATIONS

Canadian Office Action dated. Sep. 25, 2009.
Japanese Office Action dated Aug. 26, 2008 for Appln. No. 2006-297162.

* cited by examiner

*Primary Examiner* — Fan Tsang
*Assistant Examiner* — Van D Huynh
(74) *Attorney, Agent, or Firm* — Pillsbury Winthrop Shaw Pittman, LLP

(57) ABSTRACT

According to one embodiment, a communication system includes a voice mail apparatus and a communication terminal which is connected to the voice mail apparatus through a data transmission path, wherein the communication terminal includes a creator which creates e-mail data including the voice files and configuration files necessary to set the voice files to the arbitrary mail boxes as attached files, and a transmitter which transmits the e-mail data to the data transmission path toward the voice mail apparatus, and the voice mail apparatus includes, an analyzer which receives the e-mail data transmitted from the communication terminal to analyze contents of the configuration files, when the voice files and the configuration files are attached to the e-mail data, and a controller which sets the voice files to mail boxes specified by the configuration files based on analysis results.

6 Claims, 2 Drawing Sheets

COMMUNICATION SYSTEM AND VOICE MAIL APPARATUS

CROSS-REFERENCE TO RELATED APPLICATIONS

This application is based upon and claims the benefit of priority from Japanese Patent Application No. 2006-297162, filed Oct. 31, 2006, the entire contents of which are incorporated herein by reference.

BACKGROUND

1. Field

One embodiment of the present invention relates to a communication system which records a voice message from a caller in an arbitrary mailbox and reproduces the voice message from the arbitrary mailbox, and a voice mail apparatus for use in the communication system.

2. Description of the Related Art

Up to this time, telephone exchanges such as private branch exchanges (PBXs) and key telephone apparatuses have gained much popularity in, for example, office buildings and business establishments. Voicemail devices are each connected to the telephone exchange apparatuses. The telephone exchanges each have, for example, functions of transferring incoming calls which have arrived at the extension telephone sets from outside lines to the voice mail apparatuses, respectively, when the extension telephone sets do not make responses because the telephone sets are busy, the users thereof are away from their desks, etc.

Meanwhile, after the start of the use of the telephone exchange apparatuses, sometimes it is necessary to add or change greeting messages, announcements etc., of the respective mailboxes in the voice mail boxes in response to increases in persons and changes in business contents. For such cases, conventionally, a method, in which users record greeting messages at their terminals, the terminals compress the greeting messages to transmit them to servers, and the servers update the greeting messages in the mailboxes, has proposed (for example, Jpn. Pat. Appln. KOKAI Publication No. 2005-117152).

However, the method given above sometimes deteriorates the quality of sound and makes recording operations complicated under the influence of a line status etc.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings, in general, according to one embodiment of the invention, a communication system, comprising a voice mail apparatus which is connected to a telephone exchange apparatus executing exchange processing among a plurality of telephone terminals, records voice messages to be transmitted from the telephone terminals based on set voice files in arbitrary mail boxes among a plurality of mail boxes differing for each of the telephone terminals, and reproduces voice messages recorded in the arbitrary mail boxes; and a communication terminal which is connected to the voice mail apparatus through a data transmission path, wherein the communication terminal includes: a creator which creates e-mail data including the voice files and configuration files necessary to set the voice files to the arbitrary mail boxes as attached files; and a transmitter which transmits the e-mail data to the data transmission path toward the voice mail apparatus, and the voice mail apparatus includes: an analyzer which receives the e-mail data transmitted from the communication terminal to analyze contents of the configuration files, when the voice files and the configuration files are attached to the e-mail data; and a controller which sets the voice files to mail boxes specified by the configuration files based on analysis results.

Figure 1:
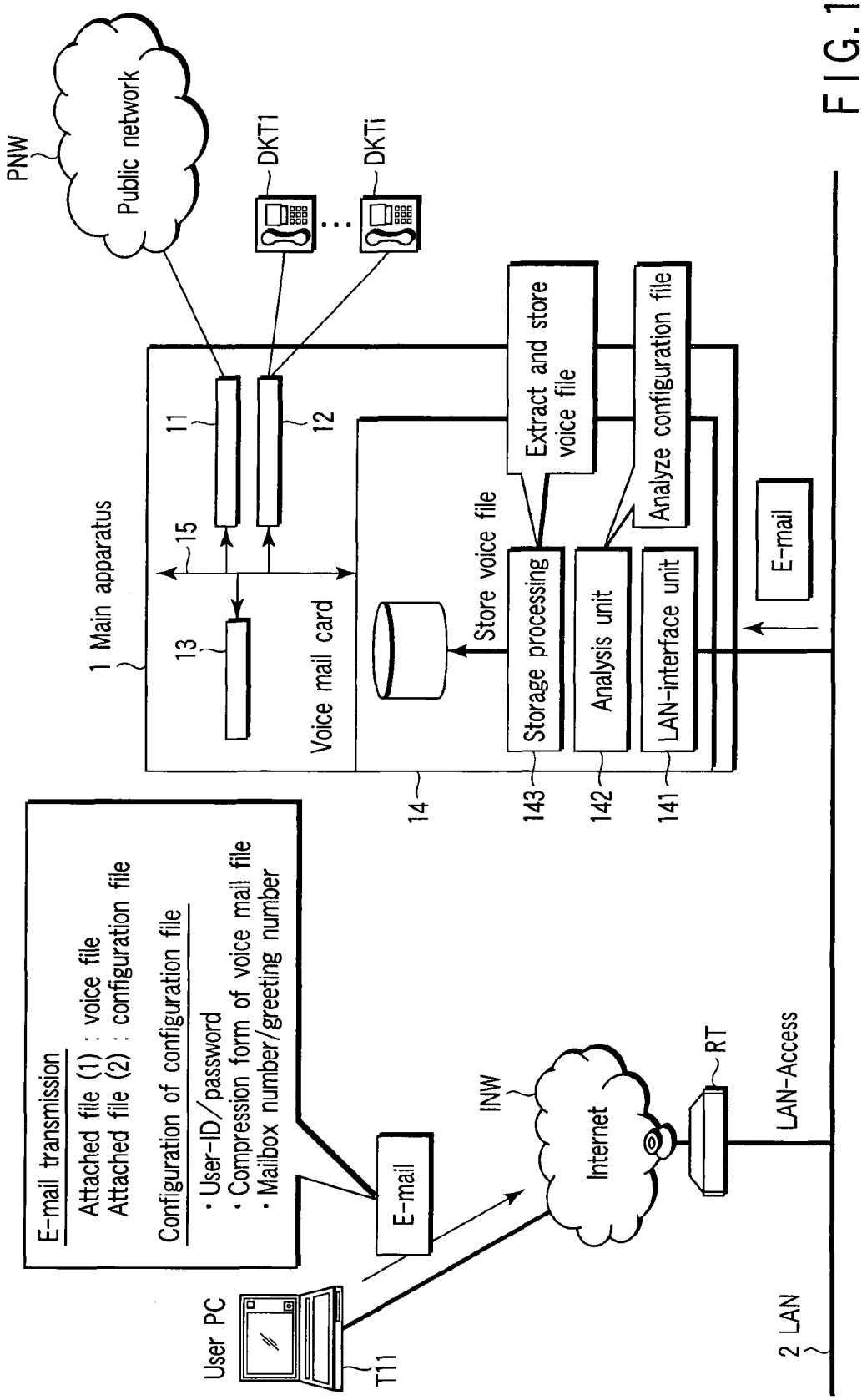
FIG. 1 is a preferred block diagram illustrating a configuration of a communication system regarding an embodiment of the present invention.

FIG. 1 is a block diagram illustrating a configuration of a communication system regarding an embodiment of the invention, and the numeric "1" indicates a main apparatus.

A main apparatus 1 includes an analog trunk interface unit 11 (hereinafter referred to as interface unit 11), digital extension telephone interface unit 12 (hereinafter referred to interface unit 12), a central control unit 13, and a voicemail card 14. The interface unit 11, the interface unit 12, the central control unit 13, and the voice mail card 14 are connected with one another via a bus 15.

The interface unit 11 is connected to a public network PNW to establish a call to and from the public network PNW.

The interface unit 12 accommodates a plurality of extension terminals DKT1-DKTi. For instance, digital key telephone sets are used as the extension terminals DKT1-DKTi. The interface unit 12 performs outgoing call/incoming call processing and transfer processing of digital signals to and from the extension terminals DKT1-DKTi.

The central control unit 13 has an incoming call response control function using the voice mail card 14 in addition to usual control functions such as outgoing call processing accompanying call requests from each extension terminal DKT1-DKTi, usual incoming call processing accompanying outside line incoming call from the network PNW, and transfer processing among the extension terminals DKT1-DKTi. When an extension terminal DKT1 that is an incoming call destination does not make a response for the incoming call, the incoming call response control function makes an incoming call to the voice mail card 14 to connect between the voice mail card 14 and a calling source thereby controls the voice mail card 14 so as to transmit a prescribed announcement message to the calling source.

The voice mail card 14 has mailboxes corresponding to the extension terminals DKT1-DKTi, respectively, and stores voice messages from callers into arbitrary mailboxes. Each mailbox prepares greeting message.

A terminal T11 is connected to the voice mail card 14 in this embodiment via a local area network (LAN) 2, a router RT and the Internet INW.

The terminal T11 is composed of a general-purpose computer and has an e-mail creation function and an e-mail transmission function.

The e-mail creation function creates e-mail data including a voice file such as a greeting message and a configuration file necessary for setting the voice file into an arbitrary mailbox, as attached files.

The e-mail transmission function transmits the created e-mail data to the Internet INW toward the voice mail card 14.

In the meantime, the voice mail card 14 has a LAN interface unit 141, an analysis unit 142, and a storage processing unit 143 as functions regarding the invention.

The LAN interface unit 141 conducts interface processing to and from the LAN 2.

The analysis unit 142 determines whether or not the voice file and the configuration file are attached to the e-mail when the e-mail arrives at the voice mail card 14 from the terminal T11. If the voice file and the configuration file are attached thereto, the analysis unit 142 analyzes the content of the configuration file.

The storage processing unit 143 sets the voice file into the mailbox specified by the configuration file based on the analysis result from the analysis unit 142.

Next, operations of the system configured as mentioned above will be described.

It is assumed that, for example, it becomes necessary to change the greeting message set in a certain mailbox on the voice mail card 14. In such a case, a user of the terminal T11 initiates an application for transmitting an e-mail to create e-mail data by inputting the greeting message desired to set from an input device.

Figures 2, 3:
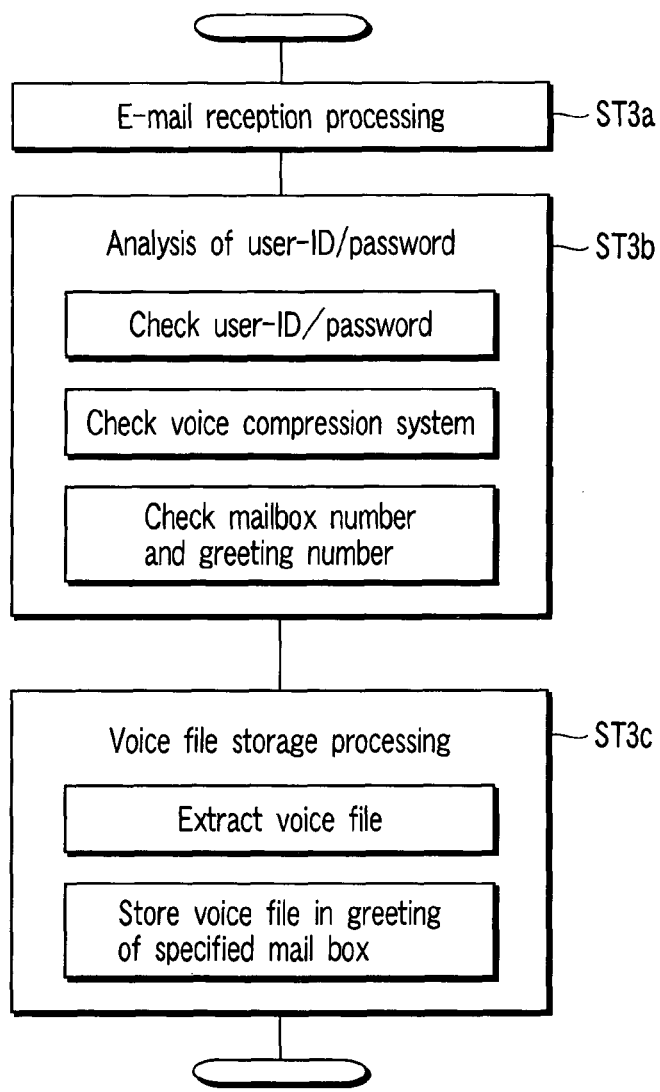
FIG. 2 is a preferred view illustrating an example of a format of a configuration file to set a voice file into a mailbox.
FIG. 3 is a preferred flowchart illustrating a control processing procedure of a voicemail card in the embodiment of the invention.

FIG. 2 illustrates an example of a format of a configuration file. This example shows the case in which "2000", "1234", "PCM (Mu-law)", "2000", and "1" are input to a user ID, a password, a voice format, a mailbox number to be a destination, and a greeting number, respectively. Here, they are input in text formats, respectively.

After creating the e-mail data then the terminal T11 calls an Internet provider, and when the terminal T11 is connected to the Internet provider, the terminal T11 transmits the created e-mail data.

The voice mail card 14 which has received the e-mail data executes control processing shown in FIG. 3.

The voice mail card 14 firstly receives the e-mail data (block ST3a) to analyze the configuration file attached to the e-mail (block ST3b).

(Check of User ID/Password)

The voice mail card 14 checks a user ID and a password. If they are not registered yet, or they cannot be authenticated, the voice mail card 14 discards the received e-mail to end the processing.

(Check of Voice Compression System)

The voice mail card 14 checks a compression mode of the attached voice file. The compression mode includes a PCM (A-law/Mu-law), a GSM and an ADCP, etc. If a system not supported by the voice mail card 14 is specified, the voice mail card 14 discards the e-mail to end the processing.

(Check of Mailbox Number/Greeting Number)

The voice mail card 14 checks whether or not the specified Mailbox number and the Greeting number are correct. If any abnormality is detected, the voice mail card 14 discards the e-mail to end the processing.

In succession, when ending the analysis of the configuration file, the voice mail card 14 shifts to voice file processing (block ST3c).

(Extraction of Voice File)

The voice mail card 14 extracts a voice file from an attached file. If any abnormality is found in header information, size, etc., the voice mail card 14 discards the e-mail to end the processing.

(Storage Processing)

The voice mail card 14 converts the extracted voice file into a storage format of the voice mail to store it in a specified mailbox.

After this, when the user of the terminal T11 accesses the mailbox which has stored the voice file, the voice attached to the e-mail is announced.

Although the description given above has shown the example of greeting, the same goes with a usual message and the voice mail card 14 stores the voice file attached to the e-mail in the mailbox which has been specified by the configuration file. The mailbox which has stored the voice file therein notifies the arrival of the voice to the user, then, the user becomes able to hear the voice through operations for a usual voice mail.

As mentioned above, in the embodiment, the terminal T11 transmits the voice file and the configuration file necessary for setting the voice file and to the voice mail card 14 by means of the e-mail via the Internet INW and the LAN 2, the voice mail card 14 utilizes the configuration file, and checks the mailbox to be set and the validity of the user before setting the voice file by using the configuration file, and if there is no problem, the voice mail card 14 sets the voice file to the specified mailbox.

Accordingly, the communication system may appropriately set the voice file with high sound quality through a simple procedure without being affected by the line status etc.

In the foregoing embodiment, the communication system does not need to input the voice file in the data format decided by the terminal T11, and arbitrary data format can be used in a convertible range. Therefore, the system may accurately set the voice file to the arbitrary mailbox even by using any type of the terminal T11.

The present invention is not limited to the embodiment described above. The aforementioned embodiment has described about an example to transmit the voice file and the configuration file by attaching them to an e-mail. However, the invention is not limited to this embodiment; the system may use an encryption key prescribed on the side of the terminal T11 and encrypt the attached file to transmit it, and may decrypt the attached file of the e-mail data transmitted from the voice mail card 14 by using the encryption key. Thereby, for transmitting the voice file and the configuration file to the voice mail card 14, they are encrypted with the prescribed encryption key, therefore, the system may prevent an erroneous voice file setting and illegal voice file setting from being performed when the voice file and the configuration file are erroneously transferred to a wrong voice mail card, and even when other user intends to plagiarize the voice file and the configuration file.

Other than this, a configuration and a type of a communication system, a configuration and a type of a mail apparatus, a functional configuration of a voice mail card, a type of a communication terminal, a setting control procedure and its content of a voice file, etc., may be implemented in a various modifications without departing from the spirit or scope of the general inventive concept of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication system, comprising:
a voice mail apparatus which is connected to a telephone exchange apparatus executing exchange processing among a plurality of telephone terminals, the voice mail apparatus configured to transmit an announcement message associated with an incoming call destination to a telephone terminal determined as a calling source, record voice messages to be transmitted from the calling source telephone terminal in a mail box associated with the incoming call destination, when a voice message is input according to the announcement message in the calling source, and reproduce voice messages recorded in the arbitrary mail box; and
a communication terminal which is connected to the voice mail apparatus through a data transmission path, wherein the communication terminal includes:
a creator unit which creates e-mail data to be attached to the voice file and configuration file necessary to set the voice file to the arbitrary mail box as attached files, wherein the voice file is set in the arbitrary mail box necessary to change the announcement message set in the arbitrary mail box; and
a transmitter which transmits the e-mail data to the data transmission path toward the voice mail apparatus, and
wherein the voice mail apparatus further includes:
an analyzer unit which receives the e-mail data transmitted from the communication terminal to analyze contents of the configuration file, when the voice file and the configuration file are attached to the e-mail data; and
a controller which sets the voice file to mail box specified by the configuration file based on a result of analysis by the analyzer unit.

2. The communication system according to claim 1, wherein the controller includes a converter which converts data formats of the voice file attached to the e-mail data into data formats that enable the voice file to be set to the mail box.

3. The communication system according to claim 1 wherein the transmitter transmits attached files by encrypting by using a prescribed encryption key, and
the analyzer unit decrypts the attached files of the transmitted e-mail data by using the encryption key.

4. A voice mail apparatus, which is connected to a telephone exchange apparatus executing exchange processing among a plurality of telephone terminals, and is configured to transmit an announcement message associated with an incoming call destination to a telephone terminal determined as a calling source, record voice messages to be transmitted from the calling source telephone in a mail box associated with the incoming call destination, when a voice message is input according to the announcement message in the calling source, and reproduce voice messages recorded in the arbitrary mail box, and also enables connecting a data transmission path, the voice mail apparatus further comprising:
an analyzer unit which receives e-mail data transmitted through the data transmission path to analyze contents of configuration file necessary for setting the voice file to an arbitrary mail box when voice file and the configuration file are attached to the e-mail data, wherein the voice file are set in the arbitrary mail box necessary to change the announcement message set in the arbitrary mail box; and
a controller which sets the voice file to mail box specified by the configuration file based on a result of analysis by the analyzer unit.

5. The communication system according to claim 1, wherein the configuration file manages at least one of a manage user ID, a voice format, a mailbox number associated with the incoming call destination, and an announcement number.

6. The voice mail apparatus according to claim 4, wherein the configuration file manages at least one of a manage user ID, a voice format, a mailbox number associated with the incoming call destination, and announcement number.

* * * * *